May 26, 1970     T. F. ROCHE     3,514,592

LAMP HOLDER

Filed Feb. 8, 1968

May 26, 1970     T. F. ROCHE     3,514,592
LAMP HOLDER
Filed Feb. 8, 1968     6 Sheets-Sheet 2
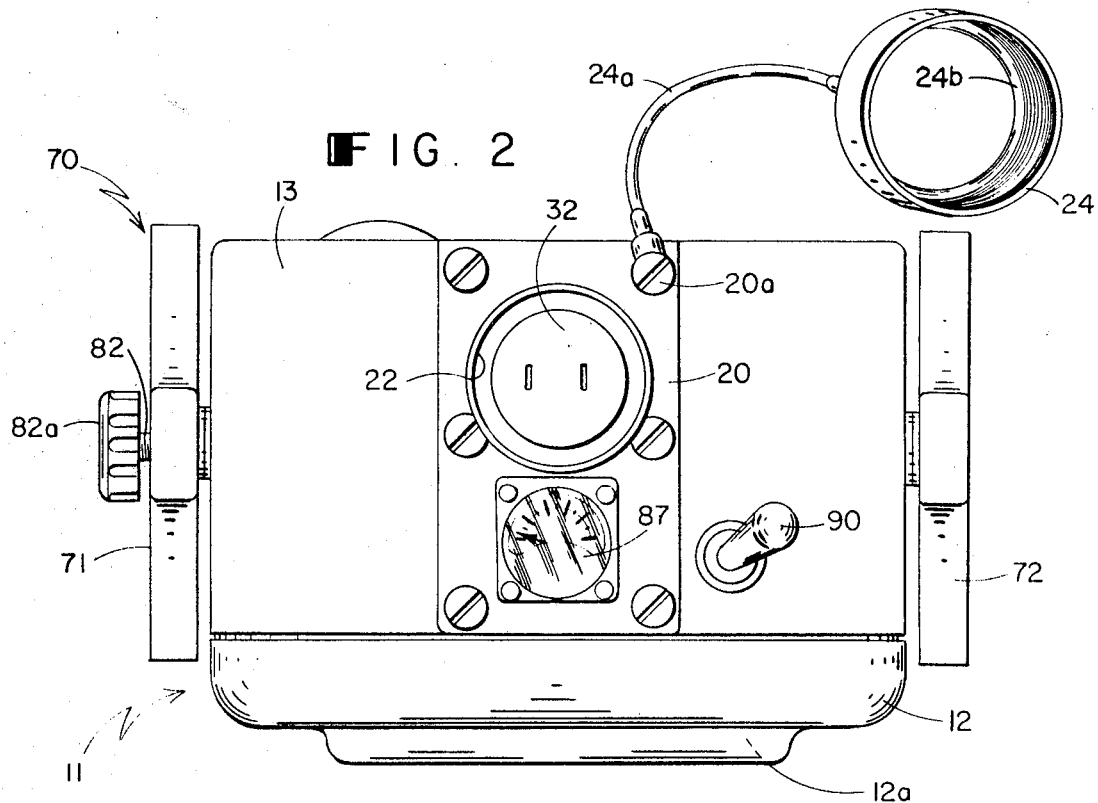
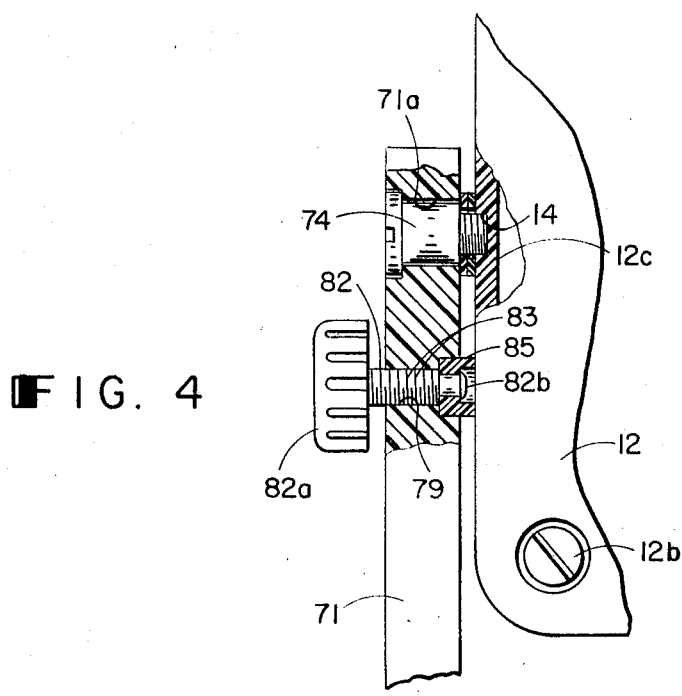

May 26, 1970  T. F. ROCHE  3,514,592
LAMP HOLDER
Filed Feb. 8, 1968  6 Sheets-Sheet 4

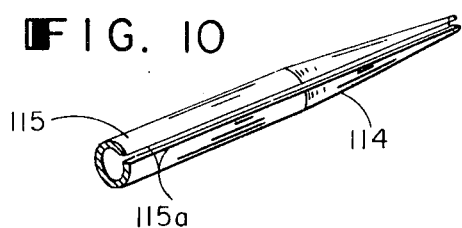
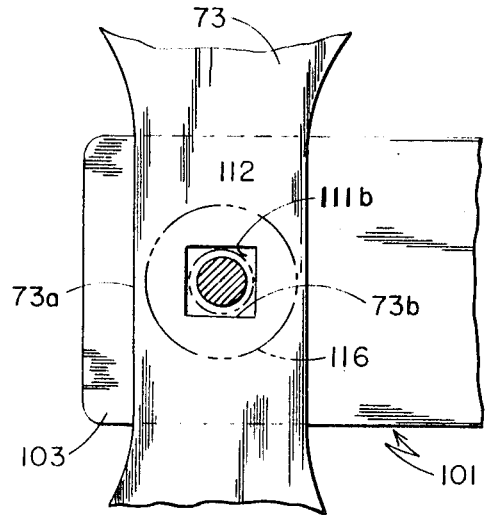
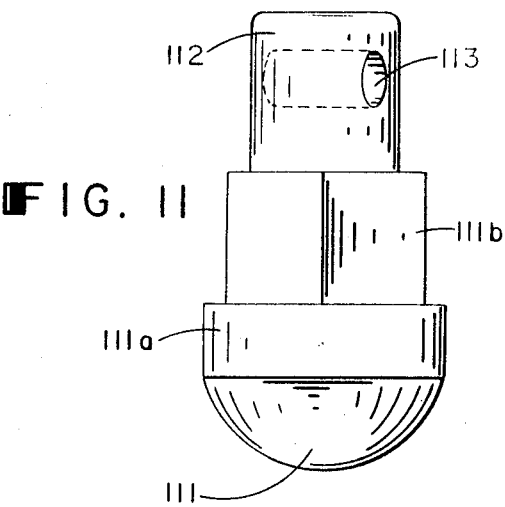
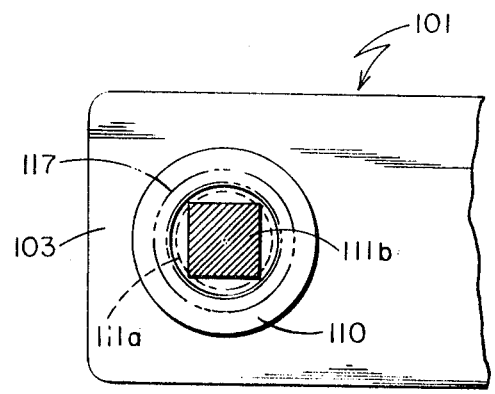
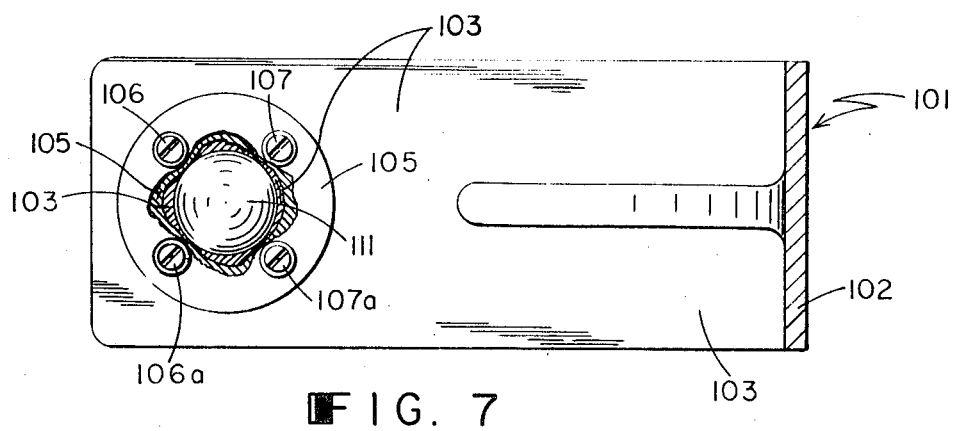

May 26, 1970     T. F. ROCHE     3,514,592
LAMP HOLDER

Filed Feb. 8, 1968     6 Sheets-Sheet 6

United States Patent Office 3,514,592
Patented May 26, 1970

3,514,592
LAMP HOLDER
Thomas F. Roche, 21 W. Main St.,
Merrimac, Mass. 01860
Continuation-in-part of application Ser. No. 664,862,
Aug. 31, 1967. This application Feb. 8, 1968, Ser.
No. 706,746
Int. Cl. F21l 15/12
U.S. Cl. 240—52.3                                12 Claims

ABSTRACT OF THE DISCLOSURE

An electric lantern which is non-conductive and suitable for industrial, marine or military use. The lantern has a combination cradle-handle which permits it to be tilted vertically and held in any position as a standing light. The cradle-handle has a flat end portion and a pair of sidearms upon which the lantern is pivotably mounted. A manipulable threaded shaft extends through an orifice in one of the side arms and has a friction member on the end thereof for engaging the side surface of the lantern to hold it in a pre-selected position. The cradle-handle is also adapted for detachable combination with a hidden swivel on a bracket to provide horizontal rotation.

---

This present application is a continuation-in-part of my prior co-pending application Ser. No. 664,862 filed Aug. 31, 1967 now abandoned.

BACKGROUND OF INVENTION

This invention relates to portable and emergency lanterns for industrial, marine, or military use. Such lanterns as have been previously described are of limited use because they have been difficult to position. Thus, utility companies or others working in subterranean close quarters with dangerous electrical cables in close proximity, have not found prior lanterns satisfactory for their purposes because of the difficulty of positioning and directing the light where needed. In addition such persons require such a lantern to be safe as well as provide sufficient power, reliability, and weather resistance. In particular, utility company workers installing or repairing overhead cables or wires require a safe lantern which can be freely adjusted both horizontally and vertically.

SUMMARY OF INVENTION

The invention comprises generally a lantern having a lamp in a body with flat sides supported by a combination cradle-handle having two sidearm portions and a substantially flat outer cross portion. The side arms pivot on the sides of the lamp body. Extending through one of the side arms is a manipulable threaded means having frictional end means for engaging the flat side of the lamp body in any desired position. The pivot points are such that the lantern can rotate 360° and be positioned in any selected tilt and held there by means of the threaded means. The cross portion of the cradle is preferably of relatively substantial width of the order of magnitude of at least about one-half the width of the lantern and has an intermediate cut-out portion to form a hand grip. The sidearms are preferably of flat side surface so that they may be used to position the lantern on its side. The side arm portions preferably have a slight inward taper towards the pivot points. The threaded holding means preferably comprises a shaft having a portion threaded to engage with threading in a hole through the side arm and terminating in a resilient means. All the exposed portions of the lantern and its cradle-handle are made of plastic and the assembly of parts is waterproof. The resulting device is thus not only tiltable to any position as a standing light. but also non-conductive and hence safe for use adjacent to electric utilities.

Where a 360° horizontal turning ability is required, as in the case of utility workers in elevated buckets, the lamp cradle is modified by having a central orifice on the handle for cooperation with a swivel bracket assembly. The bracket assembly includes a hemispherical receiving surface in the horizontal portion of the bracket which is engageable with a vertically positioned hemispherical tipped rod whose upper portion locks into the handle orifice. The rod member has an upper extension provided with an orifice cooperable with a transverse locking pin to hold the assembly in a fixed position.

This invention can be used with externally powered lanterns or self-powered lanterns including those adaptable to being recharged.

BRIEF DESCRIPTION OF DRAWINGS

FIG. 2 is a plan view of the lantern of FIG. 1 with the power cord removed.
FIG. 4 is an enlargement with partial sectioning of a portion of the left side of FIG. 1.
FIG. 7 is a partial bottom view of FIG. 6.
FIG. 8 is a partial transverse view along line 8—8 with partial sectioning.
FIG. 9 is a partial transverse view along line 9—9 with partial sectioning and phantom.
FIG. 10 is a partially sectioned partial view of the locking pin.
FIG. 11 is a side view of the swivel member.

SPECIFIC EXAMPLES OF INVENTION

Figure 1:
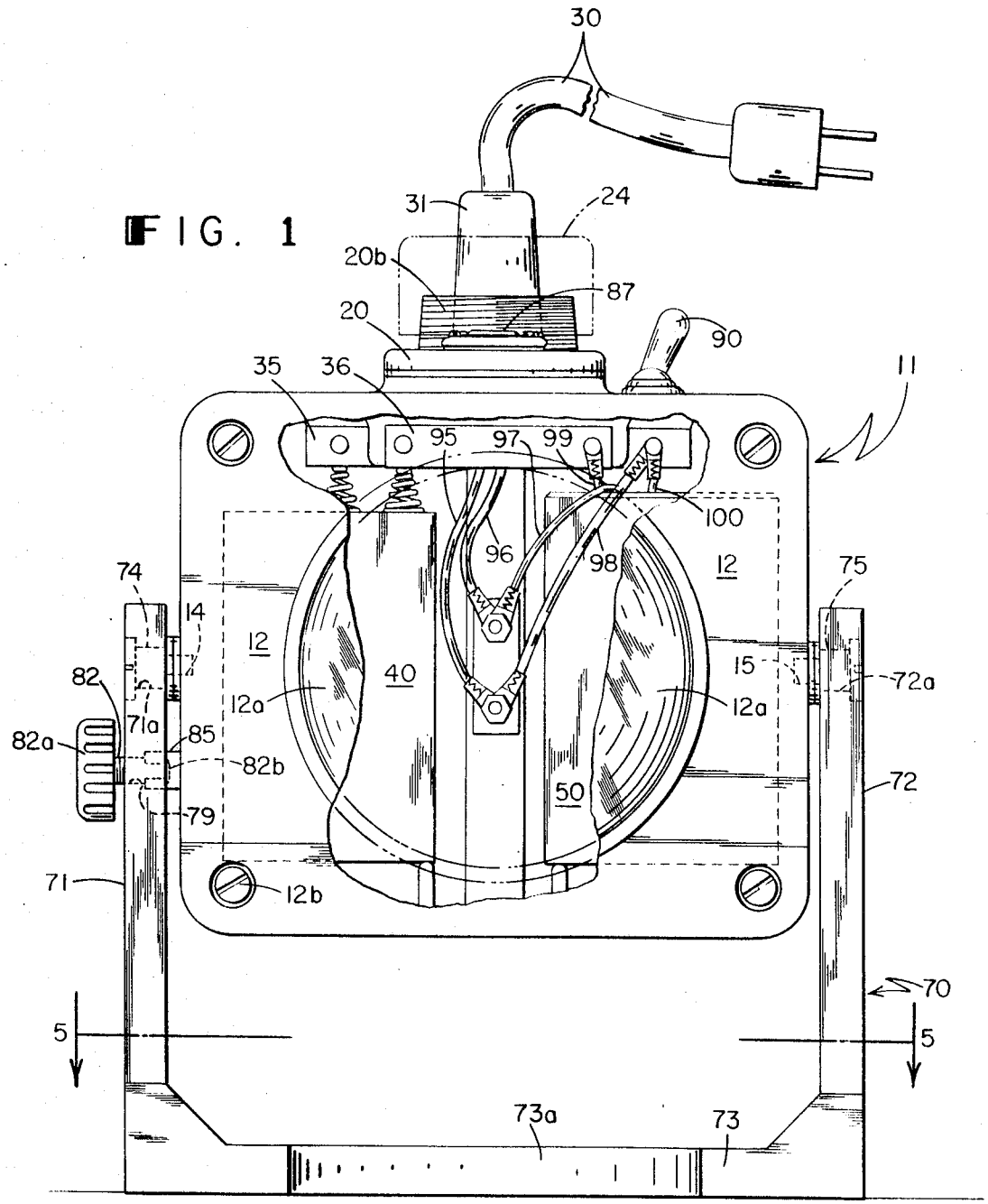
FIG. 1 is a front view of the lantern in standing position with partial cutaway, showing a power cord.
Figure 3:
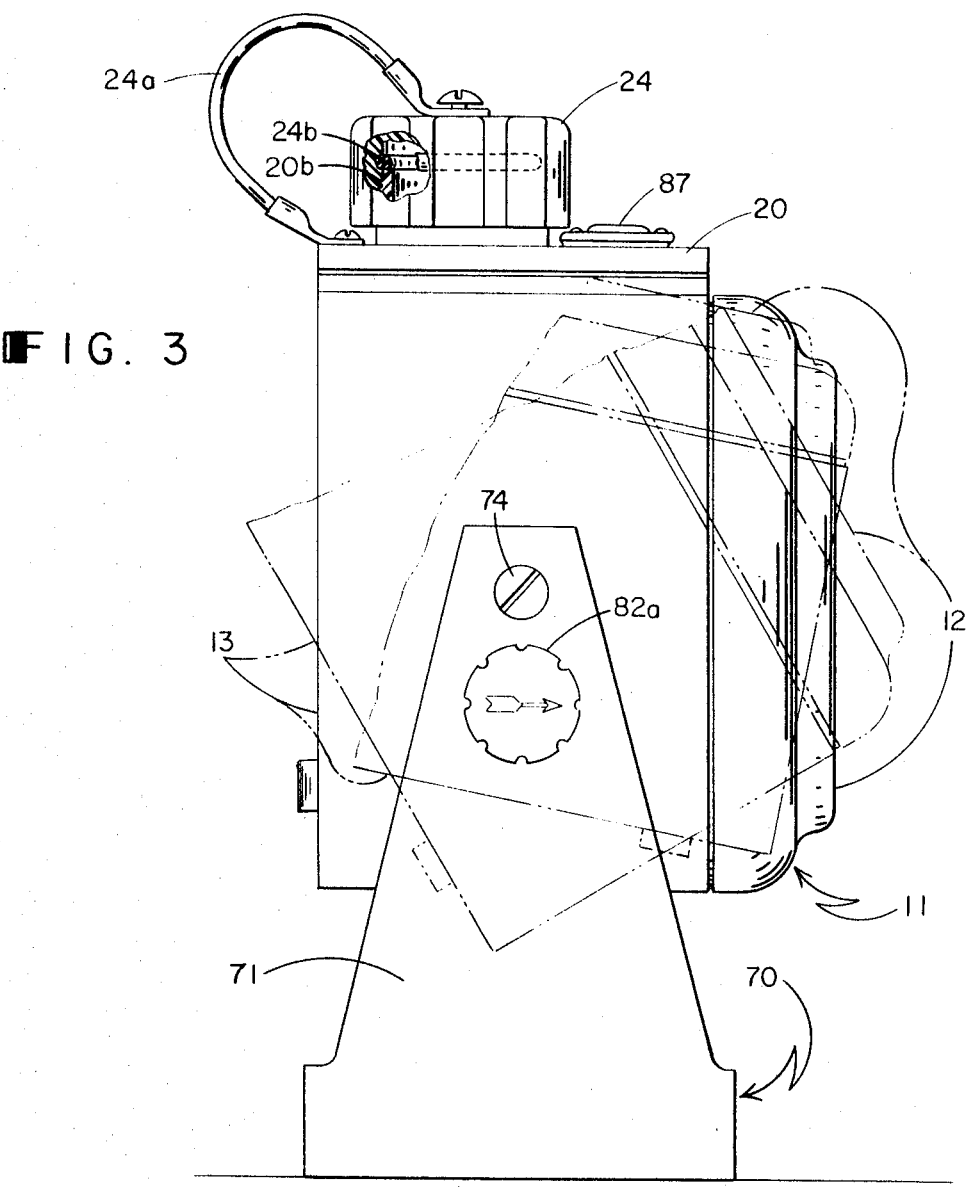
FIG. 3 is a left side elevation.
Figure 5:
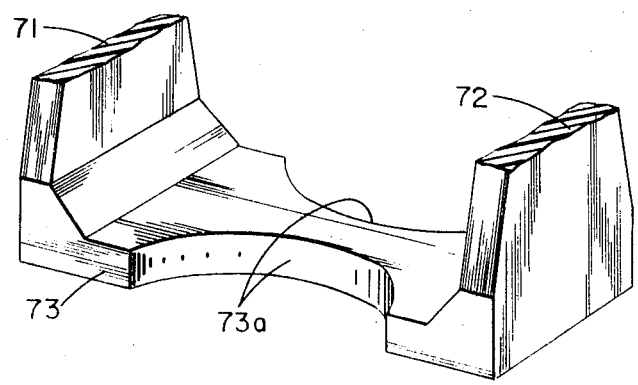
FIG. 5 is a plan view along line 5—5 of FIG. 1.
Figure 6:
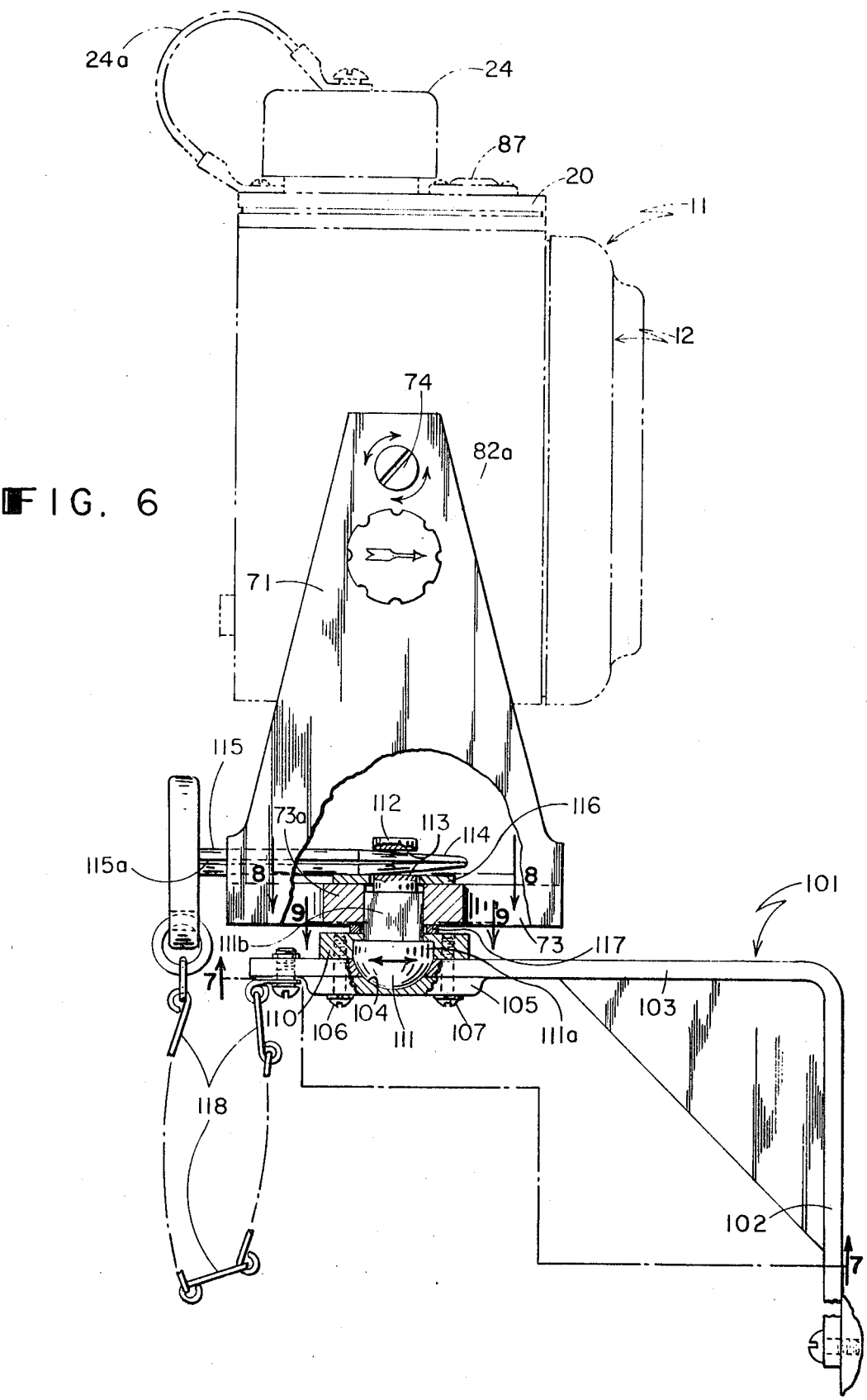
FIG. 6 is a side view with partial breakaway, with the lamp shown in phantom, of the lamp cradle modified so as to be engaged with the bracket.

FIGS. 1–5 illustrate one example of this invention. The lantern 11 illustrated therein has a front section 12 and a rear body section 13 both molded from plastic. A lamp 12a is positioned in the front section with a gasket. Cover section 12 is held onto the body section 13 by means of cover mounting screws 12b in conjunction with a resilient sealing gasket. The body section 13 has a top opening and contains spaces for holding a battery 40 and charger 50. The spring terminals of battery 40 contact bus bars 35 and 36, while leads 98, 99 and 100 run from the bus bars to the charger 50 and lead 95. Lead 97 runs from the common terminal with lead 96 to the battery charger 50.

Covering the top opening of body section 13 is a plastic body 20 attached by means of screws and a gasket 21. Plastic body 20 is provided with a projecting threaded well 22 having wall 20b. A cover 24 is attached by a cap retainer line 24a to screw 20a in body 20 and seats on the well 22 with a gasket 24b. Extending through the bottom of the well 22 is a male receptacle 32 connected to the battery charger 50 in the body 13. Meter 87 which reads the battery charge is mounted in body 20. A cord 30 with a female connector 31 and male connector is provided for bringing external current into the battery charger. Switch 90 with leads 95 and 96 operates the lamp.

The combination cradle-handle 70 comprises two flat side arm members 71 and 72 which taper in width and also slightly inwardly and are attached through orifices 71a and 72a to pivot rods 74 and 75 whose ends are anchored at recesses 14 and 15 on the sides of the lamp body 13.

Recesses 14 and 15 are generally selected to be along the axis of the center of gravity of the lantern. The side portions 71 and 72 expand to join the cross flat bottom portion 73 which has an intermediate hand grip cut-out 73a. The arms 71 and 72 are sufficiently long to permit 360° rotation of the lantern. The cradle 70, with its portion 71, 72 and 73 and its side orifices 71a and 72a, is preferably molded as a single piece.

In order to hold the lantern at the desired tilted position, one of the side arms, 71, is provided with an opening 79 just below the orifice 71a. The opening 79 has a threaded portion 80 which registers with the threading 83 on a shaft 82. On the reduced end 82b of the shaft 82 is mounted a nylon-phenolic cap 85 of low resilience. Cap 85 has an annular projection which engages the flat surface of the side of body portion 13. Knob 82a mounted on outer end of shaft 82 permits easy manipulation of cap 85 to loosen or tighten the lantern.

All the exposed parts of the lantern, including the housing and body, the cradle, and the position holding means are made of plastic so that there is no possibility that the lantern can act as a conductor between the individual holding or using the lantern and a source of current such as a third rail in a subway.

FIGS. 6–11 illustrate a modification of this present invention which enables the user to obtain a 360° horizontal turning ability. As shown in these figures, the lamp cradle-handle is provided with an orifice for detachable mounting on a swivel-bracket assembly.

The bracket assembly comprises a body 101 which has a vertical portion 102 adapted for attachment to a supporting member and a horizontal portion 103 on which the cradle of the lantern is mounted. The handle portion 73a has a square orifice 73b. A swivel member 111 is provided which has a lower hemispherically shaped portion, an intermediate portion 111b of square cross section adapted to register with orifice 73b and projection 112 extending above said orifice and having a transverse orifice 113. The hemispherical portion of member 111 engages and is supported by a hemispherically shaped receiving plate 105, plate 105 being either integrally a portion of horizontal bracket portion 103 or attachable thereto, and said horizontal portion 103 having a central orifice 104 to accommodate said hemispherically shaped receiving surface 105.

The assembly which holds the swivel member 111 in position comprises a clamping ring 110 which is joined to member 105 by four bolts 106, 107, 106a and 107a, the clamping ring being offset so as to fit on top of the cylindrical extension of the hemispherical bottom. A washer 117 is provided above the clamp plate and below the bottom surface of the handle 73a. Above the orifice 73b is a washer 116 and a locking pin 115 having a tapering portion 114 and engageable with the transverse orifice 113.

In assembly, members 105, 111, 110 and 117 are normally in preassembled condition. Accordingly, it is only necessary to fit the lantern by the orifice 73b onto the square portion 111b and then insert the locking pin 115 into the orifice 113. In dissembling, it is only necessary to remove the locking pin and washer 116 to allow the lantern with its cradle-handle to be removed.

The swivel arrangement is completely concealed and hence weatherproof. The bracket 101, including the hemispherically shaped support 105, is normally made of weather resistant, electrically insulating plastic. Member 111 is preferably made of a strong metal. By use of this swivel-bracket modification, the lantern can be precisely positioned at any desired angle, both horizontal and vertical. Cap retainer line 24a and locking pin retainer line 118 are preferably made of plastic covered wire.

Figure 12:
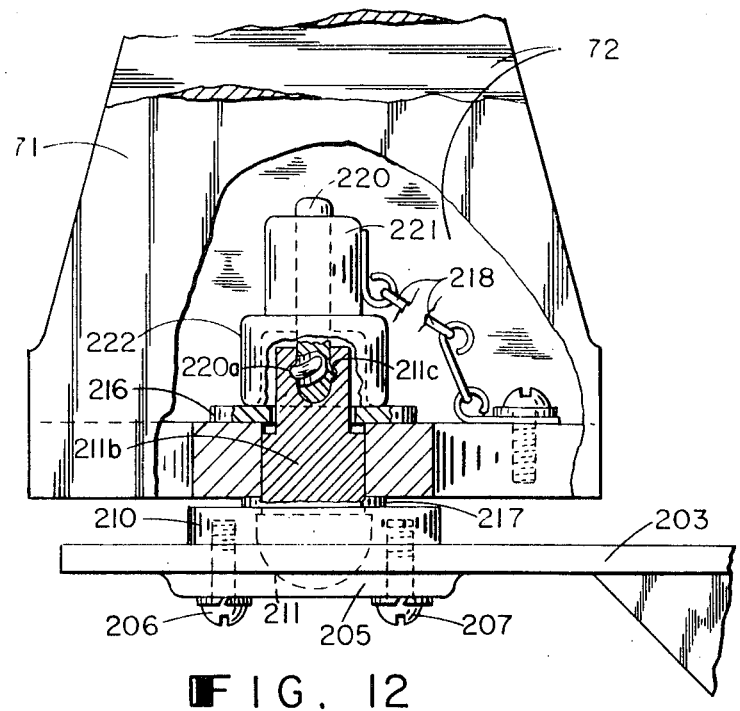
FIG. 12 is a side view with partial breakaway of the lamp cradle modified so as to be engaged with the bracket, but with another form of retaining arrangement.

The modification illustrated in FIG. 12 is similar to that illustrated in FIGS. 6 through 11 except that a snap fit member is used instead of a locking pin.

The horizontal portion 203 of the bracket assembly supports the lamp cradle. Swivel member 211 is held in position by a clamping ring 210 joined to member 205 by bolts 206 and 207. A washer 217 is provided above clamping ring 210. The swivel member 211 is substantially identical with swivel member 111 in that it has a lower hemispherically shaped portion, an intermediate portion of square cross section 211b adapted to register with the square orifice in the handle portion and a projection extending above said orifice. Said projection has a top vertically oriented well with indentations 211c for registering with the ridge 220a of snap fit member 221. Snap fit member 221 has a central portion 220 which goes into the well and contains the ridge 220a. The skirt portion 222 of member 221 rests on a washer 216 which is above the square orifice. The snap fit member 221 has a retainer line 218 similar to line 118.

I claim:
1. The combination of a lantern and a cradle-handle; said cradle-handle comprising a substantially flat end portion and two side arms; and lantern being pivotally mounted on said side arms so as to be freely rotatable 360°; a manipulable threaded shaft being provided which extends through a registering threaded orifice in one side arm and terminates in a friction means engagable with the side surface of said lantern.

2. The combination of claim 1, wherein said engagable surface is substantially flat.

3. The combination of claim 1 wherein said threaded shaft is positioned below the pivot point.

4. The combination of claim 1 wherein said threaded shaft comprises an external knob and terminates in a plastic annular projection.

5. The combination of claim 4 wherein said engagable side surface is made of plastic.

6. The combination of claim 1 wherein the pivot axis is along the approximate center of gravity of the lantern.

7. The combination of claim 1 wherein the flat end portion has a depth of at least one-half the depth of the lantern.

8. The combination of claim 1 wherein a portion of the central part of the flat end portion is cut away to form a gripping section.

9. A lantern as recited in claim 1, said lantern being freely rotatable 360° both vertically and horizontally, and further comprising a polygonal orifice in said flat end portion, a vertical swivel member whose upper portion is shaped to register with said orifice and whose lower portion is hemispherically shaped, horizontal supporting means having a registering hemispherically shaped cup to receive said lower portion, and means for holding said lantern member and supporting means together.

10. The combination of claim 9 wherein said upper portion has a projection provided with a transverse orifice for cooperation with a removable locking pin.

11. The combination of claim 9 wherein said holding means is detachable.

12. The combination of claim 9 wherein said upper portion has a projection provided with a vertical orifice for cooperation with a removable snap fit member.

References Cited

UNITED STATES PATENTS

| | | | |
|---|---|---|---|
| 2,753,443 | 7/1956 | Grohsgal | 240—81 X |
| 2,894,693 | 7/1959 | Howarth | 240—3 X |
| 2,914,660 | 11/1959 | Wrigglesworth | 240—3 X |
| 3,086,104 | 4/1963 | Atkin | 240—3 |
| 3,350,554 | 10/1967 | Wood | 240—3 |

NORTON ANSHER, Primary Examiner

F. L. BRAUN, Assistant Examiner

U.S. Cl. X.R.

240—10.63; 248—142, 183